United States Patent

Splitz

[15] 3,635,846

[45] Jan. 18, 1972

[54] EXPANDED POLYELECTROLYTE RESIN AND PROCESS FOR MAKING SAME

[72] Inventor: Stephen A. Splitz, Scituate, Mass.
[73] Assignee: Amicon Corporation, Cambridge, Mass.
[22] Filed: July 13, 1967
[21] Appl. No.: 653,004

[52] U.S. Cl. .......................... 260/2.5 R, 159/48 R, 260/874, 260/899
[51] Int. Cl. ..................................... C08f 47/08, C08f 33/08
[58] Field of Search ........................... 260/874, 2.5; 159/48 R

[56] References Cited

UNITED STATES PATENTS

| | | | |
|---|---|---|---|
| 2,218,385 | 10/1940 | Schulze | 260/2.5 |
| 2,832,746 | 4/1958 | Jackson | 260/857 |
| 3,467,604 | 9/1969 | Michaels | 260/2.5 |

Primary Examiner—Murray Tillman
Assistant Examiner—Wilbert J. Briggs, Sr.
Attorney—R. W. Furlong

[57] ABSTRACT

A process for making highly expanded polyelectrolyte gel powders suitable for incorporation into, and imparting improved moisture vapor transmission rates to, films comprising hydrophobic polymers and the like. This process comprises the removal of water and other plasticizing components from precipitated polyelectrolyte complex gels, redispersing the gel in a volatile liquid medium, and thereupon causing the rapid evaporation of said volatile medium under conditions, conveniently moderately elevated temperatures, which prevent moisture from condensing on the polyelectrolyte gel as it is separated from the aforesaid volatile medium. The unique products of the invention are highly porous and characterized by their high absorptivity of dioctyl phthalate, their low-bulk density and their ability to enhance the moisture vapor transmission of a standard polyvinylchloride film formulation by a factor in excess of about 5 when incorporated therein at loadings of about 15 percent on total polymer weight.

4 Claims, No Drawings

EXPANDED POLYELECTROLYTE RESIN AND PROCESS FOR MAKING SAME

BACKGROUND OF THE INVENTION

Hydrophobic, organic polymer compositions of both thermoplastic and thermosetting nature are well known, and widely used for the manufacture of unsupported film, sheeting, protective and/or decorative coatings on woven and nonwoven fabrics, paper, and leather, and as components of laminated structures along with fabrics, and felted sheet materials such as paper, leather, etc. Many of the aforementioned articles possess mechanical and structural properties which make them eminently suitable for use in wearing apparel, footwear, upholstery, surgical dressings and the like; however, these materials lack the important property of high permeability to water vapor, which is required to provide the necessary comfort to the human organism when clothed in or contacted with these materials.

On the other hand, there are many hydrophilic, organic polymer compositions which possess water vapor permeabilities more than adequate for human comfort; however, these materials possess mechanical, structural, and/or chemical properties which render them useless in the manufacture of the aforementioned articles. Most hydrophilic polymers, for example, are either soluble in, or swell markedly when contacted with, water, and become hard and brittle when dried. Furthermore, most hydrophilic polymers have relatively low strength and elongation when wet.

In an effort to combine the desirable mechanical and structural properties of hydrophobic polymers with the desirable moisture permeability of hydrophilic polymers, it has been proposed to disperse a finely divided hydrophilic polymer with controlled water swellability in a hydrophobic polymer, thereby producing a two-phase composite, of which the hydrophobic polymer is the continuous phase. In order that the composite should display good dimensional stability and retain mechanical strength under wet conditions, it is essential that the dispersed hydrophilic polymer be chemically modified so as to prevent excessive water absorption and swelling. However, the very steps which in the past have been taken to minimize such water absorption and swelling (e.g., chemical cross-linking by means of covalent bonds) operate to reduce the water vapor permeability of the hydrophilic polymer and, hence, of the composite prepared therewith.

Among various hydrophilic polymers which have in the past been used for this purpose are formaldehyde-cross-linked polyacrylamide, and reaction products of certain anionic poly electrolytes (e.g., polyacrylates, polyvinylphosphonates) with certain cationic polyelectrolytes (polyamines, quaternary ammonium polymers) cross-linked via epoxy or vinyl groups. Composites prepared with reasonable concentrations of these hydrophilic polymers display modest improvements in moisture vapor permeability relative to those of the hydrophobic polymer components alone; however, at concentrations of hydrophilic polymer sufficient to impart significantly high moisture vapor permeability, the desirable mechanical properties of strength and durability attributable to the hydrophobic polymer component are either lost or seriously impaired.

SUMMARY OF THE INVENTION

It is an object of the invention to provide a highly porous form of polyelectrolyte resin for imparting high moisture vapor transmission to polymeric compositions.

It is another object of the present invention to provide a process for preparing improved forms of polyelectrolyte powders suitable for incorporation into films in impart high-moisture-vapor transmission characteristics thereto, which forms of powders had not heretofore been obtainable.

These objects have been achieved by the discovery of a process comprising the following steps:

1. preparing an ionically cross-linked polyelectrolyte complex resin;

2. removing substantially all the water-soluble impurities therefrom; for example, by washing with a polar liquid such as water in which said polyelectrolyte is not itself soluble.

3. removing substantially all the residual moisture from the polyelectrolyte complex resin obtained in step (2); for example, by washing with a desiccating liquid such as acetone or the like;

4. redispersing the resulting moisture-free polyelectrolyte complex resin in a volatile and water-free liquid medium such as acetone or the like;

5. causing the rapid evaporation of said volatile liquid medium at a temperature sufficiently high to prevent the condensation of moisture on the polyelectrolyte complex gel being separated from the evaporating liquid, but sufficiently low to avoid plastication and collapse of highly expanded particles as they are formed. Temperatures between about 0° to 150° C. are advantageous.

6. recovering said gel in the form of highly expanded and porous power.

The novel highly porous polyelectrolyte resins formed by the process of the invention are characterized by dioctyl phthalate (DOP) absorption levels above about 5.0 grams DOP per gram of polyelectrolyte resin but preferably above 8.0 grams DOP per gram of polyelectrolyte resins. They usually have bulk densities of less than about 0.15 grams per cc. after being passed through a 325-mesh sieve. Most advantageously, the bulk densities are below about 0.1 grams per cc.

After the polymer is initially formed, it is separated from the liquid reaction medium; washed with water to remove any excess salts, monomer or solvent, and washed with a drying solvent, e.g., acetone, to remove any residual moisture. The moisture-free polyelectrolyte is then dispersed in a volatile liquid, which liquid is not a solvent nor a plasticizer therefor, and separated therefrom at a temperature above the temperature at which atmospheric moisture can condense on the polymer. Spray drying is a particularly useful separation technique when acetone is used as a volatile liquid for dispersing the polyelectrolyte.

The novelty and practical importance of achieving this heretofore-unattainable degree of porosity in polyelectrolyte gel powers is seen by comparing the factors by which (1) nonexpanded polyelectrolyte complex increases moisture vapor transmission rate of a standard polyvinyl-chloride-type film formulation and by which (2) the expanded polyelectrolyte complex of the type disclosed in this application increase moisture vapor transmission rate of the same standard polyvinyl-chloride-type film formulation: At a 15 percent loading based on the total weight of polymer in a standard and conventional polyvinyl chloride plastisol formulation, a highly expanded, highly (i.e., porous) polyelectrolyte complex resin characterized by a dioctyl phthalate (DOP) absorption value of 6.8 grams DOP per gram of resin will impart a moisture vapor transmission rate 620 percent of that achievable with the same formulation but wherein all the polymer is polyvinyl chloride. Moreover, this moisture vapor transmission rate is two to four times higher than the rate obtainable with conventional polyelectrolyte complex resin powder of the same apparent particle size as that of the expanded material to which it is being compared. Still higher moisture vapor transmission rates are obtainable with more porous powders.

It has also been found that it is advantageous to maintain the polyelectrolyte complex resins loading in compositions below about 25 percent of total polymer, and preferably from 15 to 20 percent of total polymer. These lower loadings can be achieved with relatively little deterioration, or no deterioration, in the physical properties of the compositions into which they are incorporated. Moreover, it has been discovered that more useful and relevant data on moisture vapor transmission can be achieved at such lower polyelectrolyte complex resin loadings because, unlike at higher loadings, there is no substantial "false surface" provided by the protrusion of polyelectrolyte filler above the surface of the film. Such "false surface" tends to provide unrealistically high moisture vapor transmission rate data.

The ionically cross-linked polyelectrolytes which are polymers formed of two ionically associated synthetic organic linear polymers, one of the polymers having dissociable anionic groups attached to a polymeric chain which, without the anionic groups, forms a water-insoluble film-forming resin, and the other of the linear polymers having dissociable cationic groups attached to a polymeric chain which likewise, without said cationic groups, forms a water-insoluble film-forming resin. It is essential that the ionic association form the sole bond between the two linear polymers and that the anionic and and cationic groups be those which in aqueous solution display ionization constants greater than $10^{-2}$, and that each of the linear polymers have sufficient dissociable groups to render it soluble in water in the absence of the other polymer. These ionically cross-linked polyelectrolyte polymers may be prepared in finely divided form in the manner described in my copending application Ser. No. 340,531 filed Jan. 27, 1964.

Among the polymers containing dissociable cationic groups which may be used as ingredients in preparing the high-porosity ionically cross-linked polyelectrolytes of the present invention are poly (ethylene methyloxonium) chloride, poly (vinyl dimethyloxonium) chloride, poly (vinyl benzyldimethylsulfonium) chloride, poly (vinyl benzyltrimethylphosphonium) chloride, poly (vinylbenzyltrimethylammonium) chloride, and the like. Among the polymers containing anionic groups which may be used in preparing the polyelectrolytes used in the present invention are poly (alpha-fluoro acrylic acid), poly (2,2-dichloro-3-butenoic acid), poly (4-vinylphenyl difluoro acetic acid), polyvinyl sulfuric acid, polyvinyl sulfonic acid, polyvinyl methylol sulfonic acid, polyvinyl toluene sulfonic acids, polystyrene sulfonic acid, poly-alpha-methylstyrene sulfonic acid, and alkali metal salts thereof, preferably the sodium or potassium salts. Of these, the sulfonic acid polymers and their alkali metal salts are preferred.

The molecular weight, of the organic linear polymers which may be interacted to produce the ionically cross-linked polyelectrolytes which are useful in the present invention, is not critical. However, the molecular weights of each polymer (i.e., both the polymer containing cationic groups and and polymer containing anionic groups) is preferably at least 50,000 so that the polymer is solid and capable of film formation, each polymer preferably having at least one ionic group (anionic or cationic as the case may be) for every six repeating monomeric units in the chain, or at least one such ionic group for each average chain interval of 12 carbon atoms in polymers containing a chain of carbon atoms in the backbone of the polymer molecule.

For best results, both in terms of enhanced moisture permeability and good mechanical strength, the size of the particles of ionically cross-linked polyelectrolyte should be as small as possible, in no event greater than 50 microns, and preferably well below 1 micron in their greatest dimension. The particles are preferably in the colloidal size range, from 0.01 to 5 microns in their greatest dimension.

In most cases it is desirable that the binder polymer, i.e., the hydrophobic polymer, be film-forming and that it be flexible or elastic; among such materials are natural rubber, neoprene, polymers of butadiene or of iosprene, e.g., cispolybutadiene, copolymers of butadiene or of other dienes with styrene or acrylonitrile, copolymers of isobutylene with small proportions of butadiene, polyolefins such as polyethylene, polypropylene, polyisobutylene, and copolymers of such olefins with each other or with dienes, e.g., ethylene-propylene copolymer elastomers, polymers and copolymers esters of acrylic acid and of methacrylic acid, cellulose esters and ethers such as cellulose acetate, cellulose butyrate, ethyl cellulose, or hydroxyethyl cellulose, plasticized polyvinyl chloride, internally plasticized polyvinyl chloride i.e., copolymers of vinyl chloride with vinyl acetate, and polyurethanes. The elastomers or rubbers may be either vulcanized or unvulcanized. Other hydrophobic organic polymers which may be used as the binder include such vinyl polymers as polyvinyl chloride (unplasticized), polyvinyl acetate, polyvinyl butyrate, polyvinyl acetal, polyvinyl butyral, polymers and copolymers of vinylidene chloride, polymers and copolymers of styrene, methyl styrene, chlorostyrene, etc., superpolyamides, polysiloxanes, phenolformaldehyde resins, ureaformaldehyde resins, melamine-formaldehyde resins, polyester and polycarbonate resins, polymers of tetrafluoroethylene and of monochlorotrifluoroethylene, and the like.

The following examples illustrate the invention. The test procedures by which the expanded polyelectrolyte complex resins are characterized and evaluated are set forth after example 3.

EXAMPLE 1

A first solution is prepared of:

| | |
|---|---|
| Water | 800 g. |
| $H_2SO_4$, reagent grade | 1,200 g. |
| Poly (sodium styrene sulfonate) | 400 g. |
| Acetone | 1,200 g. |

A second solution is prepared of:

| | |
|---|---|
| Water | 680.0 g. |
| $H_2SO_4$, reagent grade | 1,200.0 g. |
| Poly (vinyl benzyltrimethyl-ammonium chloride), (31% solution in water) | 1,320.0 g. |
| Acetone | 1,200.0 g. |

The relative quantities of polyelectrolyte polymer in the above solutions are selected to provide a stoichiometric mixture in terms of polyion equivalents.

The second solution is added, with stirring, to the first solution and thereafter placed in a jar on a roll mill for about 30 minutes. The resulting polyelectrolyte solution is mixed with cold water to precipitate the polyelectrolyte complex resin, vacuum filtered, and washed in acetone until less than 0.1 percent of water is detected in the recovered acetone wash. The resin is then redispersed in acetone and spray dried at a temperature of about 80° C.

A polyelectrolyte complex resin prepared in this way may be characterized by testing for bulk density and DOP absorption. Films prepared of 85 percent polyvinyl chloride and 15 percent of such a polyelectrolyte complex resin are tested for moisture vapor transmission rate. Typical results:

| | Bulk Density | DOP Absorption | Moisture Vapor Trans. Rate Increase Factor Over PVC Control |
|---|---|---|---|
| 1. | 0.103 grams/cc. | 5.95 grams/ gram resin | 5.4 |
| 2. | 0.100 grams/cc. | 6.08 grams/ gram resin | 6.3 |

EXAMPLE 2

A first solution is prepared of:

| | |
|---|---|
| Poly (sodium styrene sulfonate) | 80.8 g. |
| Water | 1,640.0 g. |
| Acetone | 536.0 g. |

A second solution is prepared of:

| | |
|---|---|
| Poly (vinyl benzyltrimethyl-ammonium chloride), (31% solution in water) | 149.2 g. |
| Water | 888.8 g. |
| Acetone | 1,480.0 g. |

These two solutions are combined under very high shear so that the unreacted portion of each polymer is never more than about 0.2 percent concentration by weight of the total mixture.

A polyelectrolyte complex resin gel precipitates, settles and, after the decanting off of supernatant liquid, is washed with 4,000 cc. of 22° C. distilled water three times to remove water-soluble salts, residual monomer, and any other water-soluble contaminants which may be present.

The water-washed resin gel is then washed three times again in acetone to remove substantially all residual water. Material thus desiccated is redispersed in 2 liters of acetone and sprayed onto an 80° C. surface in a stream of air.

Resultant polyelectrolyte resin gel adsorbed 6.8 grams DOP per gram of resin and, when incorporated into the standard PVC-plastisol formulation at a weight level of only 15 percent, showed an increase in moisture vapor transmission of 6.2 times over the transmission rate of a film of the same formulation but with no polyelectrolyte complex resin incorporated therein.

The poly (sodium styrene sulfonate) used in the foregoing examples has a molecular weight in the range from about 3 to 5 million and is available from Dow Chemical Company under the trade designation SA–1291. The poly (vinyl benzyl-trimethylammonium chloride) is available from Dow Chemical Company under the trade names QX–211.7, QX–3521 and the like.

EXAMPLE 3

A first solution was prepared from the following:

| Purifloc A–21 | 10.6 g. |
| Water | 275.0 g. |
| Acetone | 110.0 ml. |

Purifloc A–21 is a poly (sodium styrene sulfonate) sold by Dow Chemical Company.

A second solution was prepared from the following:

| P–112–115 | 10.0 g. |
| Water | 194.0 g. |
| Acetone | 300.0 ml. |

P–112–115 is a polycation obtainable from Calgon Corporation.

The two solutions were mixed to yield a rather gummy polyelectrolyte complex resin which, after being washed with distilled water and centrifuged several times, was washed with 500 ml. of acetone three times more, redispersed in 2 liters of acetone, entrained in a stream of air, and flash-dried on a 80° C. surface.

The resulting material had a DOP absorption level of 8.4 grams of DOP per gram of resin.

MOISTURE VAPOR TRANSMISSION TEST

A control film is formed of polyvinylchloride plastisol. This standard plastisol formulation used as a control in moisture vapor transmission tests is:

| Material | Weight, Parts |
|---|---|
| Polyvinylchloride Powder | 85.0 |
| dioctyl phthalate | 95.0 |
| Coplasticizer | 5.0 |
| Stabilizer | 3.0 |
| Titanium Dioxide | 5.0 |
| Metallic sulfonate Additives | 0.5 |

The polyvinylchloride powder is available under the trade designation Geon 121 by B. F. Goodrich and Company.

The coplasticizer is available under the trade designation Flexol E.P.O. from Union Carbide Corporation.

The stabilizer is available under the trade designation Ferro 1720 by the Ferro Stabilizer Company.

The titanium dioxide is available from the Glidden Company under the trade designation R–44.

The metallic sulfonate additive is available from the Continental Oil Company under the trade designation Demivis.

The formulation is uniformly blended on a three-roll paint mill-4 to 6 passes usually suffice at 3.0-mil and 1.5-mil settings on the feed roll and apron roll respectively.

When polyelectrolyte complex is incorporated into the formulation to be tested one mil gaps are used on both the feed roll and apron roll. Moreover, it is usually desirable to adjust the viscosity of polyelectrolyte-containing plastisols by adding a diluent, e.g., xylene at a concentration of six to eight parts per 100 parts of formulation. Such adjustment facilitates the casting of a uniform film for testing of moisture vapor transmission.

Film drawdowns are conveniently made on casting paper of the type supplied by S. D. Warren Company by means of a Gardner knife applicator. A fused film of about 5 mils thickness is used for moisture vapor transmission rate measurements. These films are placed in a vacuum chamber for 30 minutes at room temperature to remove entrapped air bubbles which, if present, would tend to distort the moisture vapor transmission data. The films are then fused at temperatures of 165° C. for 3 minutes to 3.5 minutes. Examination for pin holes is made and any film sample containing pin holes is discarded before testing.

Thereupon the test is run generally according to ASTM test E–96–63T (D–Water Method). The following deviations from the test procedure are made:

| | ASTM Test | Instant Test Procedure |
|---|---|---|
| Temperature of Test Chamber | 32.2° C. | 35° C. |
| Recommended Sample Area: | 30 cm.$^2$ | 9.5 cm.$^2$ |

OIL ABSORPTION TEST

One gram of polyelectrolyte complex is placed on a clean glass plate. Dioctyl phthalate is added dropwise to the resin and, after each drop, is thoroughly mixed into the resin with a spatula. The test is complete at a point when the DOP-resin composition suddenly becomes a coherent mass rather than merely a damp powder. At this point the composition can be picked up on the spatula without flow. Results are reported in terms of grams of DOP adsorbed per gram of polyelectrolyte resin.

The compositions of the present invention are useful for a variety of purposes. In particular, when in the form of sheets or films, which may be reinforced or strengthened by means of fibers, threads, or yarns woven or unwoven, they are useful as moisture-permeable wrapping or packaging material. The composition may also be employed as a coating directly on the object to be protected, wherein it be metallic, ceramic, or organic in nature. Of particular importance is the use of the compositions in sheet or film form for upholstery materials, wearing apparel, including footwear, e.g., raincoats, protective gloves, shoe leather substitutes, diaper covers, etc. The antistatic properties of the compositions make them especially useful in conveyor belts, surgical sheeting, hose lining for gasoline or jet fuel hoses etc.

In general, the compositions of the present invention retain the ease of fabrication, physical stability, strength, flexibility or resiliency, heat sealability, and water repellency of the binder material to whatever extent those properties are present in the binder material. The compositions are unique, however, in having extraordinarily high moisture vapor transmissivity and antistatic properties.

Among other applications in which the products of the invention have found utility is the formation of high-moisture vapor membranes for fuel cells, for example expanded polyelectrolyte complex resin in a modacrylic resin such as that sold under the trade designation Dynel by Union Carbide Corporation. Normally thin films are desired for such applications, in such cases the polyelectrolyte complex resin may be conveniently dispersed in a solution of the polymer in which it is to be incorporated, and a film may be cast from the solution.

Although specific embodiments of the invention have been described herein, it is not intended to limit the invention solely thereto, but to include all of the variations and modifications which suggest themselves to one skilled in the art within the spirit and scope of the appended claims.

What is claimed is:

1. A process for making a highly porous ionically cross-linked polyelectrolyte resin powder which comprises providing finely divided particles of resin formed of two ionically associated synthetic organic linear polymers, one of the polymers having dissociable anionic groups attached to a polymeric chain which, without the anionic groups, forms a water-insoluble film-forming resin, and the other of the polymers having dissociable cationic groups attached to a polymeric chain which, without the cationic groups, forms a water-insoluble film-forming resin, the anionic and cationic groups being those which in aqueous solution display ionization constants greater than $10^{-2}$ and each polymer having sufficient dissociable groups to render it soluble in water in the absence of the other polymer, said ionic association forming the sole bond between said polymers, washing said particles with water, removing the water from said particles by washing with acetone, dispersing the particles in acetone, and causing rapid evaporation of said acetone at a temperature below the softening temperature of said polyelectrolyte resin and above the temperature at which water moisture condenses on the particles.

2. A process as defined in claim 1 wherein said dispersed polymer is spray-dried.

3. A process as defined in claim 1 wherein said polymer having dissociable anionic groups is poly (sodium styrene sulfonate) and said polymer having dissociable cationic groups is poly (vinyl benzyltrimethylammonium chloride).

4. As a composition of matter, an ionically cross-linked polyelectrolyte resin powder characterized by a dioctyl phthalate adsorption value of above about 5 grams of dioctyl phthalate per gram of powder prepared in accordance with claim 1.

* * * * *

UNITED STATES PATENT OFFICE
CERTIFICATE OF CORRECTION

Patent No. 3,635,846　　　　　Dated　　January 18, 1972

Inventor(s)　Stephen A. Splitz

It is certified that error appears in the above-identified patent and that said Letters Patent are hereby corrected as shown below:

In the Abstract, last line, after "percent" insert --based--;

Column 1, line 69 "in" should be changed to --to--;

Column 2, line 19 "power" should be changed to --powder--;

Column 2, line 43 "powers" should be changed to --powders--;

Column 3, line 43 delete "and" second occurrence;

Column 3, line 70 before "esters" (first occurrence) insert --of--;

Column 6, line 61 "wherein" should be changed to --whether--.

Signed and sealed this 5th day of September 1972.

(SEAL)
Attest:

EDWARD M. FLETCHER, JR.　　　　　ROBERT GOTTSCHALK
Attesting Officer　　　　　　　　Commissioner of Patents